May 21, 1935.  F. EARLE  2,002,223
METHOD OF WELDING RAIL JOINTS
Filed Feb. 11, 1933
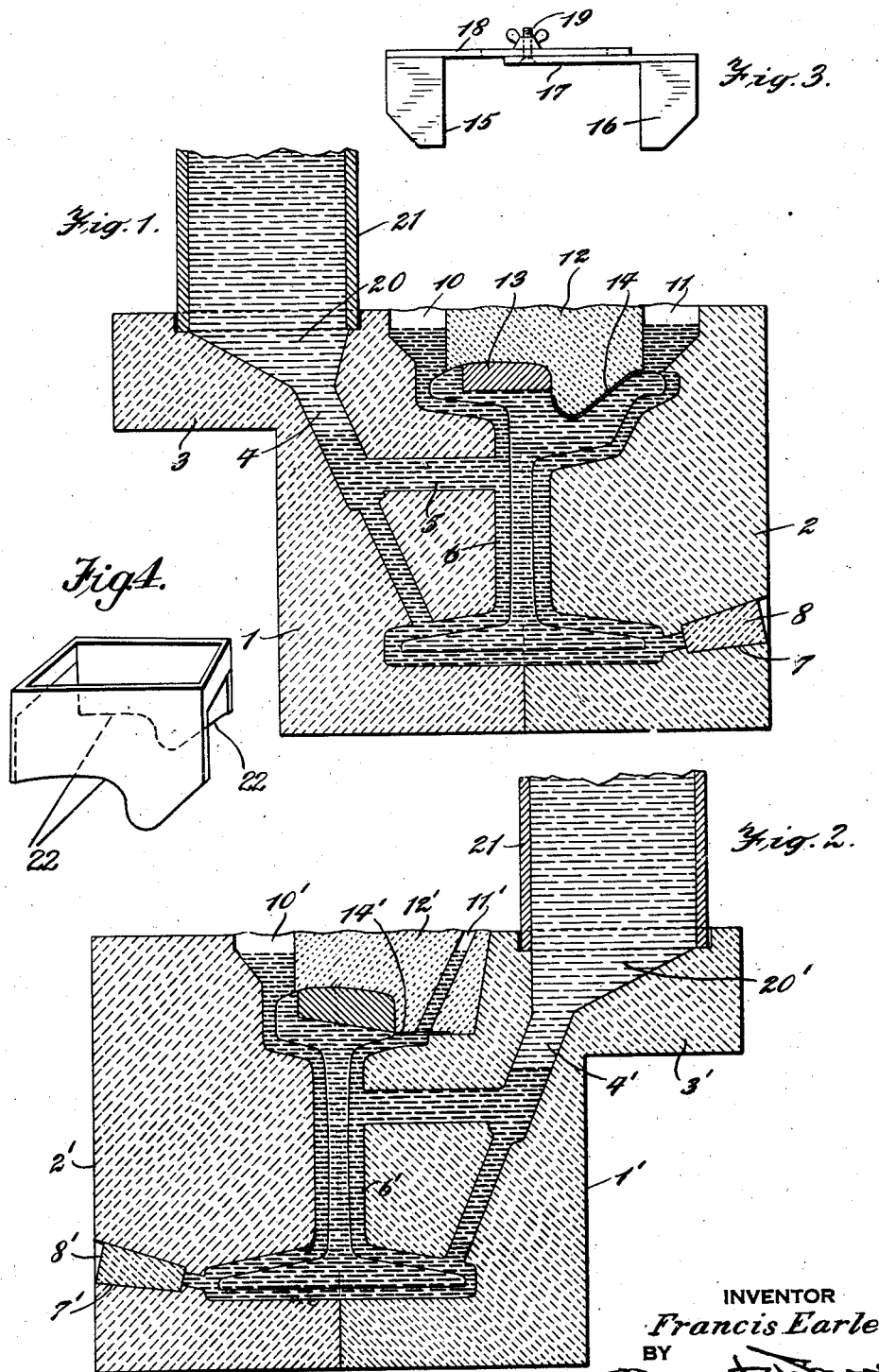

Patented May 21, 1935

2,002,223

UNITED STATES PATENT OFFICE 2,002,223

METHOD OF WELDING RAIL JOINTS

Francis Earle, Montclair, N. J., assignor to Metal & Thermit Corporation, Carteret, N. J., a corporation of New Jersey Application February 11, 1933, Serial No. 656,232

2 Claims. (Cl. 22—206)

The invention relates to certain improvements in welding rails by superheated molten metal, such as produced by the alumino-thermic reaction, and has for its object to provide a novel method of constructing and applying the molds in which the welding operation is carried out, whereby to permit the various operations to be effected without interrupting traffic and to effect material economies in time and materials.

The invention is exemplified in the accompanying drawing, in which:

Fig. 1 is a transverse sectional elevation through a mold applied to the welding of girder rails.

Fig. 2 is a similar view showing the invention as applied to T rails.

Fig. 3 is an elevation of vent forming patterns.

Fig. 4 is a view in perspective of a metal frame for use in applying and compacting the supplemental section of the mold.

In the welding of the rail ends together by superheated molten metal, and particularly by the so-called alumino-thermic process, it has been customary to form the molds in two parts adapted to surround the rail ends and having interior cavities to define the mold space, in which the superheated molten metal is teemed through a pouring gate. It has also been customary to form these mold parts separately on patterns provided for the purpose and then to apply the mold sections to enclose the rail ends, so that the molding material is brought into firm contact with the surfaces of the rail sections and the two half molds contact each other in sealing relation above and below the rail sections. Molds of this character, obviously, cannot be employed without interrupting traffic during the entire period of the welding operation.

In the more recent practice of rail welding without interrupting traffic, two lower mold sections were formed to enclose the rail ends to substantially the level of the tread surface of the rails, which were supplemented by a top or cope section that could be separately removed to permit the passage of traffic. In actual rail welding practice, this cope section is formed on a pattern having approximately the contour of the upper portions of the rails being welded and, when completed, is in the form of a four sided sheet metal frame, the lower edges of which fit approximately the contour of the upper surface of the rails. This frame is filled with rammed molding material in which are formed two vent openings disposed over opposite sides of the rail heads. After such a cope section has been formed, it has usually been found necessary to bake it thoroughly to dry out the molding material, so that, when it is placed in position on top of the lower mold section, the superheated steel to form the weld will be confined to the mold space and will not come in contact, particularly where it rises through the vents, with any moist surfaces of the molding material.

The difficulties and objections inherent in this mode of procedure are that the baking and drying of the cope section is a cumbersome operation, requiring either the provision of a small portable baking oven or of apparatus for supporting the formed cope section above the open top of the mold proper, where it is subjected to the heat from the products of combustion evolved during the preparatory preheating of the rail ends and the lower section of the mold. Furthermore, inasmuch as the cope is formed over standard patterns, it is adapted to effect a neat fit with the top surface of the rails which conform to the pattern, and, when the cope is applied to rails that have been worn or which for any other reason do not conform strictly to the pattern, it is necessary to apply some sort of plastic luting between the cope and the upper faces of the rails in order to prevent the escape of the highly fluid molten metal from the mold and also to prevent marring of the upper surface of the rails by contact with the molten metal.

It is the purpose of the present invention to obviate these difficulties and objections, by the novel method of forming the mold and effecting the weld, as hereinafter explained.

Referring to Fig. 1 of the drawing, 1 and 2 indicate complementary mold sections, which are adapted to surround the ends of the rails to be welded and to extend a short distance above the tread surfaces of the rails, which latter, as indicated, are of the girder or groove type; the adjacent ends of the rails being enclosed within the mold space 6 and the end faces being separated by a spacer 13, which may be either a separate shim-like element or an integral part of one rail end left by undercutting the end, as will be understood by those skilled in the art. It will be understood that each of the mold sections 1 and 2 is formed by ramming refractory molding material into an appropriately formed flask section or mold box over a pattern defining a part of the mold cavity. As indicated in the drawing, the section 1 of the mold is provided with a lateral offset 3, in which is formed a basin 20, into the bottom of which opens a pouring gate 4 which extends to the bottom of the mold cavity 6 and is connected to an intermediate portion of the latter by the horizontal channel 5. The other mold section 2 is provided with the usual preheating gate 7, which is closed, during the welding operation, by a plug 8.

Each of the mold sections 1 and 2, as stated, extends only a short distance above the top or tread surfaces of the rails and the entire top of the mold immediately above the rails is open from end to end in a direction longitudinal of the rails, the top opening being of a width to provide clearance for the wheels of traffic when the mold sections are applied to the rail ends, the side walls of the mold sections immediately adjacent the upper portion of the rails being fashioned to form part of the walls of vent openings 10 and 11, one on each side of the rail heads, as is usual, to permit the superheated molten metal to rise therein to insure a uniform heating and welding of the head portions of the rails.

After the two half mold sections 1 and 2 have been applied to position, as indicated in Fig. 1, the preheating of the rail ends and the interior of the mold by means of a blow torch or the like, through the preheating gate 7, is carried out. When the preheating has been effected, a thin strip of sheet metal 14 is disposed in the grooves of the rail ends so as to span the gap between said ends, and two vent plugs or patterns 15 and 16 are disposed in the open top of the mold in the partially defined vents 10 and 11, which were preformed in the mold sections 1 and 2, respectively. In order to simplify the application of these vent patterns, they are preferably connected together by a cross rod and, in order to adapt the same patterns to molds of different sizes, the cross rod is made with a slip joint, so that the patterns 15 and 16 may be adjusted toward and from each other. In its simplest form, the slip joint comprises a batten 17 having a bolt opening therein and a cooperating batten 18 having a slot therein, the bolt opening and the slot being engaged by a bolt and nut lock 19.

After the vent plugs have been placed in position the open top of the mold is filled with the molding material, which is rammed in place and is caused to assume the form indicated at 12 in Fig. 1, filling the open top of the mold between the vent patterns 15 and 16 and also between the ends of the mold along the tops of the rails. In order to facilitate the application and the compacting of the molding material forming the supplemental section 12, a light generally rectangular metal frame, such as illustrated in Fig. 4, having its lower edges 22 fashioned to conform to the tops of the rails may be provided and placed in position in the open top of the mold, resting on the tops of the rails and extending from end to end of the mold. This form of frame, in the event of its use, may be removed either before or after the pouring operation has been effected. As soon as the supplemental section 12 has been formed in situ to close the open top of the mold, except for the vent openings 10 and 11, the vent patterns 15 and 16 are removed, a pipe section 21 applied to the mold section 1 above the pouring gate and the products of the alumino-thermic reaction teemed into the pipe section 21, resulting in the filling of the mold about the rail ends with the molten metal to the complete exclusion of the slag, the static head of the slag in the pipe 21 being limited to that sufficient to force the heated metal in the mold cavity at least to the level of the tops of the rails and preferably into the vent openings 10 and 11, as indicated in Fig. 1. Contrary to expectation, the green or moist character of the section 12 of the mold produces no adverse effects when the superheated metal comes in contact therewith, but, on the contrary, the refractory material of the section 12, which is in contact with the molten metal, sets up into a self-sustaining mass, so that practically all of the supplemental section 12, except that immediately in contact with the molten metal, may be removed from the rail tops by means of a bar or scraper, shortly after the pouring operation has been completed and before either the molten metal or slag solidifies, so that traffic may pass over the site of the joint without undue delay. In other words, the portions of the section 12 immediately in contact with the molten metal in the vent openings 10 and 11 becomes caked or baked to an extent sufficient to form the same into a dam or barrier, which will prevent the molten metal overrunning the tops of the rails, when the intermediate portion of the section 12 has been removed to permit the passage of traffic.

The practice of the invention admits of the passage of cars over the site of the joint in much less time after the pouring has been effected than is possible where regular cope mold sections have been employed, so that little or no interruption to traffic ensues. Furthermore, the application of the supplemental section 12 in the manner and form stated results in a greater saving in time than would be required in the construction and preparation of the cope section and also in a considerable saving in the amount of metal required to form a homogeneous joint, because of the smaller quantity of metal required to fill the lower portion of the pouring gate and the portions of the vents immediately above the tops of the rails.

Fig. 2 exemplifies the application of the invention to T-rails and differs from the preceding illustration only in the particular form of the mold cavity and the form and location of one of the vents or risers. In this case, the mold proper comprises the mating sections 1' and 2' with the offset section 3' containing the basin 20' and the entrance to the pouring gate 4', which connects with the collar forming mold cavity 6' in the same manner as described in connection with the first modification. One vent opening 10' is formed in part in the mold section 2', and the other vent opening 11' is preferably formed in the supplemental section 12', which is rammed in the open top of the mold after a vent pattern has been applied to the vent opening 10' and a second vent pattern has been located in the open top of the mold to define the vent opening 11' in the body of the supplemental section 12'. Inasmuch as the welding collar on the gauge side of the rail extends only to the under side of the rail head, the supplemental section 12' covers the gauge face of the rail and is supported by a thin strip of material 14' placed in the bottom of a recess in the top of the mold section 1'. In order to permit the molten metal to enter the vent opening 11', the strip 14' is provided with a perforation, as shown, in alignment with the vent opening 11'.

In this case, as in the preceding mode of application of the invention, the larger part of the supplemental section 12' may be removed by means of a bar or scraper moved along the top of the rails, shortly after the pour has been completed, the molten metal in the vent openings being retained therein by the caked or baked walls of the section 12' immediately in contact with the molten metal in the vent openings.

From the foregoing explanation, it will be apparent that a material advantage of the instant invention, as compared with the former practice involving the use of a two part mold with a separate and supplemental cope section, is that the latter required the location of the vent openings in the cope section, which would necessitate leaving the cope section in place, after the pouring operation, for a sufficient time to permit the metal in the vents to almost completely solidify, as otherwise the removal of the cope would allow the molten metal in the vents to flow over the upper surfaces of the rails and damage the latter.

What I claim is:

1. The method of making molds for welding rails by superheated molten metal and with minimum interruption to rail traffic, which comprises separately forming complementary lower mold sections to a shape designed to enclose the rail ends and having an open top and cut-out end walls providing an open-ended passage above and lengthwise of the rails to provide clearance for the wheels of traffic thereover, assembling the sections about the ends of the rails, placing vent defining patterns in said open top adjacent the rail heads, compacting readily removable molding material into the open top and in contact with the tops of the rails, and removing said patterns thus completing the mold.

2. The method of welding rails by super-heated molten metal and with minimum interruption to rail traffic, which comprises enclosing the rail ends in mold sections extending a short distance above the tread surfaces of the rails and having and open top with cut-out end walls to form an open-ended passage through the mold immediately above and lengthwise of the rails to provide clearance for the wheels of traffic thereover, placing vent defining patterns in said open top adjacent the rail heads, compacting readily removable molding material into the open top and in contact with the tops of the rails and said patterns, removing the patterns thus completing the mold, teeming molten metal into the mold cavity, and thereafter removing so much of the compacted molding material as constitutes an obstruction to rail traffic.

FRANCIS EARLE.